(No Model.)
E. S. INGALSBE.
TEAKETTLE COVER.
No. 574,329. Patented Dec. 29, 1896.
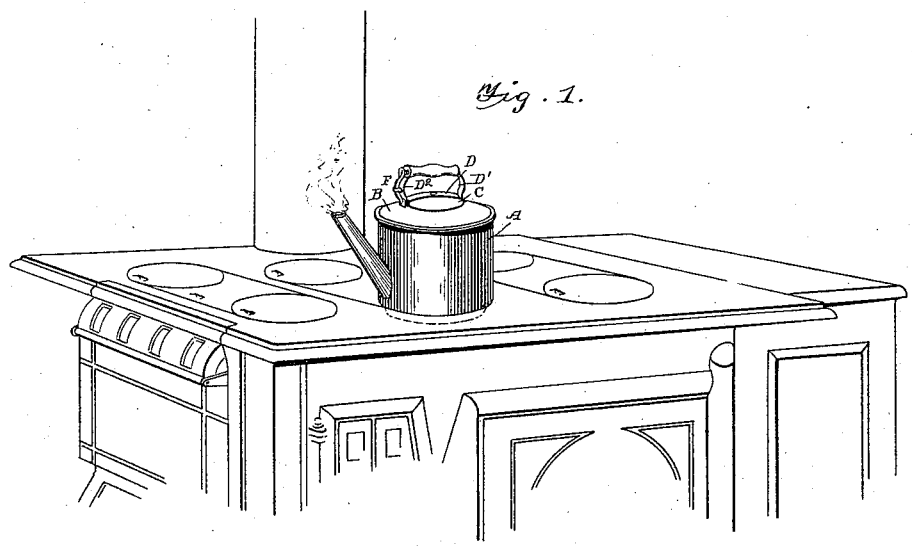
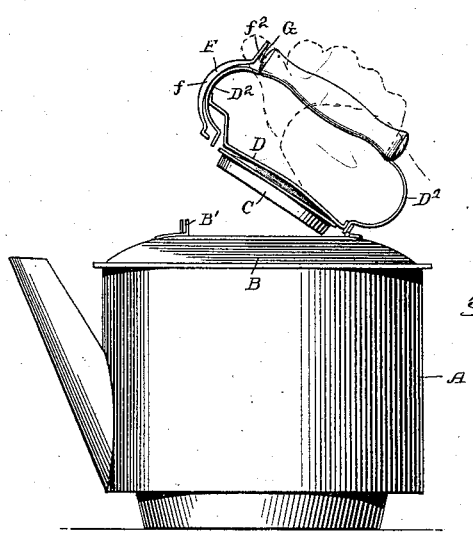
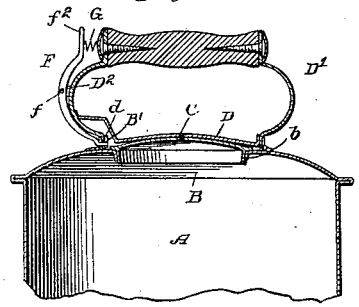
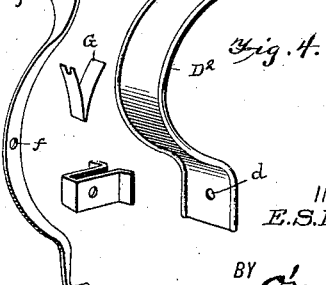
WITNESSES:
T. W. Riley
J. Edw. Luckett
INVENTOR
E. S. Ingalsbe.
BY O'Meara & Co
ATTORNEYS

UNITED STATES PATENT OFFICE.

EDWIN SETH INGALSBE, OF WHEATON, KANSAS.

TEA-KETTLE COVER.

SPECIFICATION forming part of Letters Patent No. 574,329, dated December 29, 1896.

Application filed May 15, 1896. Serial No. 591,599. (No model.)

*To all whom it may concern:*

Be it known that I, EDWIN SETH INGALSBE, residing at Wheaton, in the county of Pottawatomie and State of Kansas, have invented a new and Improved Tea-Kettle Cover, of which the following is a specification.

My invention relates to improvements in covers for kettles; and it primarily has for its object to provide the combined handle and cover member so arranged and constructed that the handle will at all times stand upright and the kettle held from swinging sidewise during pouring.

My invention also has for its object to provide an improvement of the kind described which will prevent the cover from falling off or into the kettle, and in which the handle member is so disposed that it will not get too hot for handling.

A further object of my invention is to provide a combined hinged cover and handle member and the thumb-released locking device therefor of a very simple and inexpensive construction, which can be easily manipulated, and which will not mar the general appearance of the kettle and handle member.

With other minor objects in view, which will hereinafter be referred to, the invention consists in certain novel features of construction and peculiar combination of parts hereinafter first described in detail, and then specifically pointed out in the appended claim, reference being had to the accompanying drawings, in which—

Figure 1 is a perspective view illustrating my invention as in use. Fig. 2 is a side elevation of the kettle having my handle and cover member, the cover and handle member being shown to a partly-open position. Fig. 3 is a detail section of the upper part of the kettle, the cover, and handle member, the parts being to their locked or closed position. Fig. 4 illustrates in detail the construction of the locking mechanism.

Referring now to the accompanying drawings, in which like letters of reference indicate similar parts in all the figures, A indicates the kettle, which in the general form may be of the ordinary construction.

B indicates the top of the kettle, having the usual top opening $b$, having the removable cover C.

By referring now more particularly to Fig. 3 it will be noticed the cover C is secured to a cross-piece D, which forms a part of the handle portion, which has the curved ends D' and $D^2$, formed, preferably, of sheet metal, to the upper ends of which is connected the handle member proper, which is preferably of wood or other non-conducting material.

The end D' is hinged to the top D of the kettle, while the end $D^2$ has its lower end apertured, as at $d$, and adapted to fit between the apertured guides or lugs B', secured to the top B of the kettle, as shown.

F indicates the spring-actuated locking-latch, which is pivoted at $f$ to the member D', and said latch is curved to snugly fit over the said end D', its upper end terminating in a thumb-piece $f^2$, which is normally forced outward by a spring G, which may be a coil-spring, as shown in Fig. 1, or it may be a flat spring, as shown in Fig. 4.

The lower end of the latch F has a toe portion $f^3$, which, when the parts are to their closed position, projects through the apertures in the guides B' and in the lower end of the member D and securely locks the several parts together and makes the handle practically rigid.

From the foregoing description, taken in connection with the accompanying drawings, it is thought that the advantages and complete operation of my invention will be readily understood.

It will be noticed that when the parts are in the condition shown in Fig. 1 the kettle can be carried or lifted about with absolute safety, as the handle is securely locked in position by the locking means. Furthermore, by joining the cover and the handle by a flat cross-piece and the ends of the handle with the top in the manner shown the said handle will be held from swinging laterally, thereby enabling the user to pour out the contents of the kettle without the least danger of burning.

When it is desired to fill the kettle, it is only necessary to press upon the thumb-piece with the thumb and pull up the lid and the handle to the position shown in Fig. 3.

Having thus described my invention, what I claim, and desire to secure by Letters Patent, is—

The combination with the kettle-top and the cover, said top having apertured guides at one edge of the opening, of a handle consisting of curved metallic end portions, and the wooden handle member connecting said end portions at the upper end, and the flat bar connecting said end portion to the lower end, said bar being also fixedly connected to the cover, one of said handle ends being hinged to the kettle-top, the other having an apertured lower end adapted to fit between the apertured guides of the top, and the curved lever F pivotally connected to the apertured handle end, its upper end terminating in a thumb-piece, its lower end terminating in the toe portion and adapted to pass through the apertures in the guides and in the handle end, and the spring for normally holding the lever F, to its locked position, all arranged substantially as shown and described.

EDWIN SETH INGALSBE.

Witnesses:
 DAVID PHILLIPS,
 J. N. FORCE.